United States Patent
Ishiguro et al.

(10) Patent No.: US 12,148,885 B2
(45) Date of Patent: Nov. 19, 2024

(54) NON-AQUEOUS ELECTROLYTE SECONDARY BATTERY AND ELECTROLYTIC SOLUTION USED THEREFOR

(71) Applicant: Panasonic Intellectual Property Management Co., Ltd., Osaka (JP)

(72) Inventors: Tasuku Ishiguro, Osaka (JP); Yasuko Nozaki, Osaka (JP); Tomohisa Okazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 663 days.

(21) Appl. No.: 17/424,231

(22) PCT Filed: Jan. 6, 2020

(86) PCT No.: PCT/JP2020/000078
§ 371 (c)(1),
(2) Date: Jul. 20, 2021

(87) PCT Pub. No.: WO2020/158299
PCT Pub. Date: Aug. 6, 2020

(65) Prior Publication Data
US 2022/0115700 A1  Apr. 14, 2022

(30) Foreign Application Priority Data

Jan. 31, 2019  (JP) ................. 2019-016392

(51) Int. Cl.
| | | |
|---|---|---|
| *H01M 10/0567* | (2010.01) | |
| *H01M 4/525* | (2010.01) | |
| *H01M 10/0525* | (2010.01) | |
| *H01M 10/0568* | (2010.01) | |
| *H01M 10/0569* | (2010.01) | |
| *H01M 4/02* | (2006.01) | |

(52) U.S. Cl.
CPC ....... *H01M 10/0567* (2013.01); *H01M 4/525* (2013.01); *H01M 10/0525* (2013.01); *H01M 10/0568* (2013.01); *H01M 2004/028* (2013.01); *H01M 10/0569* (2013.01)

(58) Field of Classification Search
None
See application file for complete search history.

(56) References Cited

U.S. PATENT DOCUMENTS

| | | |
|---|---|---|
| 2014/0349198 A1 | 11/2014 | Lim et al. |
| 2016/0013517 A1 | 1/2016 | Nakazawa et al. |
| 2017/0214092 A1 | 7/2017 | Okumura et al. |
| 2017/0222268 A1 | 8/2017 | Abe et al. |
| 2018/0375154 A1 | 12/2018 | Tian et al. |
| 2021/0036371 A1 | 2/2021 | Okumura et al. |

FOREIGN PATENT DOCUMENTS

| | | |
|---|---|---|
| CN | 107112591 A | 8/2017 |
| JP | 8-195221 A | 7/1996 |
| JP | 2006-32300 A | 2/2006 |
| JP | 2008-198409 A | 8/2008 |
| JP | 2015-522924 A | 8/2015 |
| JP | 2017-21949 A | 1/2017 |
| WO | 2014/157591 A1 | 10/2014 |
| WO | 2016/009994 A1 | 1/2016 |
| WO | 2016/052752 A1 | 4/2016 |

OTHER PUBLICATIONS

Y. Ding, R. Wang, L. Wang, K. Cheng, Z. Zhao, DB. Mu, B. Wi. A short review on layered LiNi0.8Co0.1Mn0.1O2 positive electrode material for lithium-ion batteries, Energy Procedia 105 ( 2017 ) 2941-2952.*
Battery Handbook, "Li(Ni$_{0-8}$Co$_{0-15}$)Al$_{0-05}$)O$_2$ Positive electrode", Ohmsha, Ltd., Feb. 10, 2010, pp. 441-444, cited in ISR, w/English partial translation (6 pages).
International Search Report dated Mar. 24, 2020, issued in counterpart International Application No. PCT/JP2020/000078 (3 pages).
English Translation of Chinese Search Report dated Jun. 12, 2023 for the related Chinese Patent Application No. 202080011090.8. (3 pages).

* cited by examiner

*Primary Examiner* — Carlos Barcena
(74) *Attorney, Agent, or Firm* — WHDA, LLP

(57) ABSTRACT

A non-aqueous electrolyte secondary battery including a positive electrode, a negative electrode and a liquid electrolyte, wherein the liquid electrolyte contains a lithium salt and isopropyl acetate, and the lithium salt includes lithium bis(fluorosulfonyl)imide, and a content of isopropyl acetate in the liquid electrolyte is 1000 ppm or less with respect to a mass of the liquid electrolyte.

6 Claims, 1 Drawing Sheet

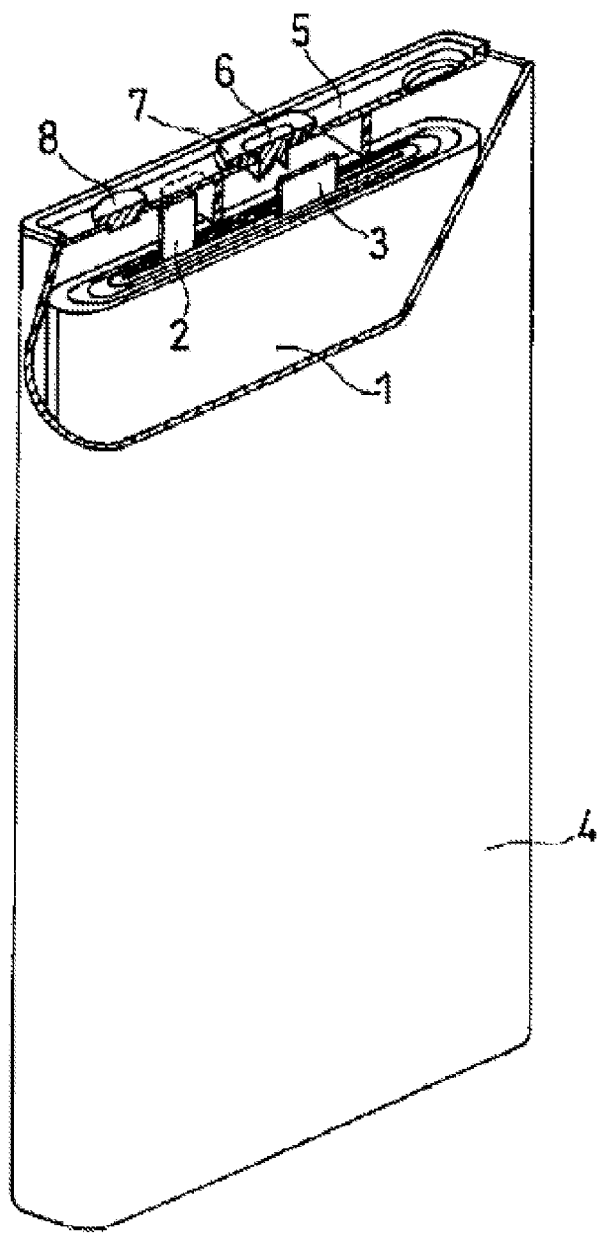

NON-AQUEOUS ELECTROLYTE SECONDARY BATTERY AND ELECTROLYTIC SOLUTION USED THEREFOR

TECHNICAL FIELD

The invention primarily relates to an improvement of liquid electrolytes for non-aqueous electrolyte secondary batteries.

BACKGROUND ART

Non-aqueous electrolyte secondary batteries, especially lithium ion secondary batteries, are expected as a power source for small consumer applications, power storage devices and electric vehicles because of their high voltage and high energy density. While a long life is required for batteries, it has been proposed to add lithium bis(fluorosulfonyl)imide to the liquid electrolyte (Patent Literatures 1 and 2).

CITATION LIST

Patent Literature

[PTL 1] WO2014/157591
[PTL 2] WO2016/009994.

SUMMARY OF INVENTION

However, repeating the cycle of charge and discharge of the battery during a long term may greatly decrease the capacity.

In view of the above, one aspect of the invention relates to a non-aqueous electrolyte secondary battery comprising: a positive electrode, a negative electrode and a liquid electrolyte, wherein the liquid electrolyte contains a lithium salt and isopropyl acetate, the lithium salt includes lithium bis(fluorosulfonyl)imide, and a content of isopropyl acetate in the liquid electrolyte is 1000 ppm or less with respect to a mass of the liquid electrolyte.

Another aspect of the present invention relates to a liquid electrolyte for a non-aqueous electrolyte secondary battery, containing a lithium salt and isopropyl acetate, wherein the lithium salt includes lithium bis(fluorosulfonyl)imide, and a content of isopropyl acetate is 50 ppm or more and 1000 ppm or less in terms of mass ratio.

According to the invention, non-aqueous electrolyte secondary batteries with excellent long-term cycle characteristics can be obtained.

BRIEF DESCRIPTION OF DRAWING

The FIGURE shows a schematic partially cut-away oblique view of a non-aqueous electrolyte secondary battery according to an embodiment of the invention.

DESCRIPTION OF EMBODIMENTS

A non-aqueous electrolyte secondary battery according to the invention has a positive electrode, a negative electrode, and a liquid electrolyte, and the liquid electrolyte contains a lithium salt and isopropyl acetate. The lithium salt includes lithium bis(fluorosulfonyl)imide:LiN(SO$_2$F)$_2$). The content of isopropyl acetate in the liquid electrolyte is 1000 ppm or less with respect to the mass of the liquid electrolyte.

Lithium bis(fluorosulfonyl)imide (also referred to as LFSI) forms a film (hereafter referred to as LFSI film) on the positive and negative electrode surfaces which is excellent in lithium-ion conductivity and inhibits oxidative degradation of the liquid electrolyte. LFSI film prevents the reduction in capacity maintenance ratios in an early stage of the cycles of charge and discharge.

On the other hand, repeated charge and discharge cycles of the battery in a long term may lead to excessive reaction of LFSI at the positive electrode surface, resulting in inactivation of LFSI film as well as causing a greater resistance and greater capacity reduction.

Isopropyl acetate has an action of suppressing an excessive reaction of LFSI on the surface of the positive electrode. Among them, when the positive electrode includes a positive electrode material or a positive electrode active material which may contain an alkaline component such as a composite oxide containing lithium and nickel, an effect of suppressing an excessive reaction of LFSI becomes remarkable.

Isopropyl acetate produces alkoxy radicals in a battery, e.g., by a reaction such as the following Reaction Scheme (1). It is believed that the alkoxy radicals adsorb on the surface of the positive electrode material to form a protective layer which inhibits the reaction of LFSI on the surface of the positive electrode (e.g., the reaction of LFSI with the alkaline component). As a consequence, it is likely that inactivation of LFSI film is suppressed, and the lowering of the capacity is also suppressed. That is, the capacity maintenance ratio can be improved when charge and discharge cycles of the battery are repeated even in a long term.

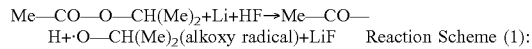

Me—CO—O—CH(Me)$_2$+Li+HF→Me—CO—H+·O—CH(Me)$_2$(alkoxy radical)+LiF    Reaction Scheme (1):

The amount of isopropyl acetate contained in the liquid electrolyte needs to be small. When the amount of isopropyl acetate becomes excessive, isopropyl acetate itself forms a high-resistance film on the surface of the positive electrode. Therefore, the content of isopropyl acetate in the liquid electrolyte needs to be 1000 ppm or less with respect to the mass of the liquid electrolyte, and may be 500 ppm or less, and even 200 ppm or less is sufficient.

Isopropyl acetate is gradually consumed by a reaction such as Reaction Scheme (1) during repeated charge and discharge cycles. Therefore, in order to sustain the effect of isopropyl acetate even when the cycle of charge and discharge of the battery is repeated in a long period of time, it is necessary that the liquid electrolyte before injection into the battery or the liquid electrolyte collected from the battery at the initial stage of use contains a sufficient amount of isopropyl acetate. The liquid electrolyte before being injected into the battery or the liquid electrolyte collected from the battery at the initial stage of use may contain, for example, 50 ppm or more of isopropyl acetate with respect to the mass of the liquid electrolyte, and the content of isopropyl acetate may be 100 ppm or more. In this case, when a liquid electrolyte contained in a battery distributed to the market is analyzed, isopropyl acetate of a detection limit or more is usually considered to remain.

The content of isopropyl acetate in the liquid electrolyte can be measured, for example, by analyzing the liquid electrolyte by gas chromatography.

When isopropyl acetate is consumed, a LFSI film derived from LFSI and isopropyl acetate is formed at least on the surface of the positive electrode. Even if isopropyl acetate is not detected from the liquid electrolyte in the battery, when at least the positive electrode has a film derived from LFSI and isopropyl acetate on its surface, such an embodiment is encompassed by the present invention.

The concentration of the lithium salt in the liquid electrolyte is preferably 1 mol/liter or more and 2 mol/liter or less, more preferably 1 mol/liter or more and 1.5 mol/liter or less. By controlling the lithium salt concentration within the above range, a liquid electrolyte having excellent ionic conductivity and moderate viscosity can be obtained. However, the lithium salt concentration is not limited to the above.

The lithium salt may include, in addition to LFSI, lithium hexafluorophosphate: $LiPF_6$. At this time, the amount of LFSI in the lithium salt is preferably 1 mol % or more and 60 mol % or less, more preferably 20 mol % or more and 60 mol % or less, and still more preferably 30 mol % or more and 60 mol % or less. The inclusion of $LiPF_6$ in lithium-salts can improve the quality of LFSI film and improve the capacity maintenance ratios in long-term cycle tests more markedly.

The lithium salt may include, in addition to LFSI and $LiPF_6$, another salt, but the percentage of the total amount of LFSI and $LiPF_6$ in the lithium salt is preferred to be 80 mol % or more and more preferred to be 90 mol % or more. By controlling the percentage of LFSI and $LiPF_6$ to the above range, it is easier to obtain superior batteries in long-term cycle characteristics.

Next, detailed explanation of a non-aqueous electrolyte secondary battery according to an embodiment of the invention is described. The non-aqueous electrolyte secondary battery includes, for example, a negative electrode a positive electrode, and a non-aqueous electrolyte as follows.

[Negative Electrode]

The negative electrode includes, for example, a negative electrode current collector and a negative electrode mixture layer formed on a surface of the negative electrode current collector and containing a negative electrode active material. The negative electrode mixture layer can be formed by applying a negative electrode slurry including a negative electrode mixture dispersed in a dispersion medium, onto a surface of the negative electrode current collector, and drying the applied film. The dried applied film may be rolled, if necessary. The negative electrode mixture layer may be formed on one surface of the negative electrode current collector, or on both surfaces thereof.

The negative electrode mixture contains a negative electrode active material as an essential component, and may contain optional components, such as a binder, an electrically conductive agent, and a thickener. The negative electrode active material includes a material which electrochemically absorbs and releases lithium ions. As a material for absorbing and releasing lithium ions electrochemically, a carbon material, a Si-containing material, or the like can be used. The Si containing material includes silicon oxides ($SiO_x$:0.5≤x≤1.5), composite materials containing a silicate phase and silicon particles dispersed in the silicate phase, and the like.

Examples of the carbon material include graphite, graphitizable carbon (soft carbon), and non-graphitizable carbon (hard carbon). Among them, graphite with superior charge and discharge stability and less irreversible capacity is preferred. Graphite means a material having a graphite-type crystal structure, examples of which include natural graphite, artificial graphite, graphitized mesophase carbon particles. The carbon material may be used singly or in combination of two or more.

Among the negative electrode active materials, a composite material containing a silicate phase and silicon particles dispersed in the silicate phase can arbitrarily select the content of silicon particles, so that a high capacity can be easily achieved. Here, the silicate phase is a composite oxide phase containing silicon, oxygen, an alkali metal, or the like. Hereinafter, a composite material in which the silicate phase is a lithium silicate phase containing silicon, oxygen and lithium is also referred to as "LSX". The higher the content of silicon particles in LSX, the larger the negative electrode capacity. LSX absorbs lithium ions by alloying silicon with lithium. High capacities can be expected by increasing the content of silicon particles. The lithium silicate phase is preferably represented by a compositional formula of $Li_ySiO_z$ (0≤y≤8, 0.5≤z≤6). More preferably, one having the compositional formula of $Li_{2u}SiO_{2+u}$ (0<u<2) can be used.

The crystallite size of the silicon particles dispersed in the lithium silicate phase is, for example, 5 nm or more. Silicon particles have a particulate phase of a silicon (Si) simple substance. When the crystallite size of the silicon particles is set at 5 mu or more, the surface area of the silicon particles can be kept small, so it is difficult to cause deterioration of the silicon particles in association with the generation of irreversible capacity. The crystallite size of the silicon particles is calculated from the half-width of the diffraction peak assigned to the Si (111) plane of the X-ray diffraction (XRD) pattern of the silicon particles by the equation of the Sheller.

As the negative electrode active material, LSX and a carbon material may be used in combination. Since the volume of LSX expands and contracts with the charge and discharge, the contact failure between negative electrode active material and negative electrode current collector is likely to occur with the charge and discharge, when the ratio occupied by LSX in the negative electrode active material increases. On the other hand, the combination of LSX with a carbon material enables to achieve excellent cycle characteristics while giving high capacity of silicon particles to the negative electrode. The ratio of LSX to the sum of LSX and the carbon material is preferably 3 to 30 mass %, for example. In this case, it is easy to achieve both high capacity and improved cycle characteristics.

As the negative electrode current collector, a metal foil, a mesh body, a net body, a punched sheet, and the like are used. The negative electrode current collector may be made of, for example, stainless steel, nickel, a nickel alloy, copper, and a copper alloy.

[Positive Electrode]

The positive electrode includes, for example, a positive electrode current collector, and a positive electrode mixture layer formed on a surface of the positive electrode current collector. The positive electrode mixture layer can be formed by applying a positive electrode slurry including a positive electrode mixture dispersed in a dispersion medium, onto a surface of the positive electrode current collector, and drying the applied film. The dried applied film may be rolled, if necessary. The positive electrode mixture layer may be formed on one surface of the positive electrode current collector, or on both surfaces thereof The positive electrode mixture includes a positive electrode active material as an essential component, and may include a binder, an electrically conductive agent, and the like as an optional component. The positive electrode active material includes a material which electrochemically absorbs and releases lithium ions. As a material for absorbing and releasing lithium ions electrochemically, a layered compound of a rock salt type crystal structure containing lithium and a transition metal, a spinel compound containing lithium and a transition metal, a polyanion compound, and the like are used. Among them, a layered compound is preferred.

Layered compounds include $Li_aCoO_2$, $Li_aNiO_2$, $Li_aMnO_2$, $Li_aCo_bNi_{1-b}O_2$, $Li_aCo_bM_{1-b}O_c$, $Li_aNi_bM_{1-b}O_c$, and the like. Among them, composite oxides including lithium and nickel represented by the general formula: $Li_aNi_bM_{1-b}O_2$ are preferred in terms of expressing high capacities. However, the higher the nickel content in the composite oxide, the higher the alkalinity of the composite oxide and the higher the reactivity with LFSI. On the other hand, when isopropyl acetate is contained in the liquid electrolyte, an excessive reaction of LFSI is suppressed because alkoxy radicals inhibit the reaction of LFSI.

Here, M is a metal and/or a semi-metal other than Li and Ni, meeting $0.95 \leq a \leq 1.2$, and $0.6 \leq b \leq 1$. Values of "a" are those in the positive electrode active material in the fully discharged state, which increases or decreases due to charge and discharge. From the viewpoint of obtaining a higher capacity, it is preferable that the above general formula satisfies $0.8 \leq b \leq 1$, and more preferably satisfies $0.9 \leq b < 1$ or $0.9 \leq b \leq 0.98$.

M is preferably at least one selected from the group consisting of, but not limited to, Na, Mg, Sc, Y, Mn, Fe, Co, Cu, Zn, Al, Cr, Pb, Sb and B. M may be at least one selected from the group consisting of, for example, Mn, Fe, Co, Cu, Zn and Al, preferably including at least one selected from the group consisting of Mn, Co and Al among them.

As the positive electrode current collector, for example, a metal foil is used, and as the material, stainless steel, aluminum, aluminum alloy, titanium or the like can be exemplified.

Examples of the binder of each electrode include a resin material, for example, a fluororesin such as polytetrafluoroethylene or polyvinylidene fluoride (PVDF); a polyolefin resin such as polyethylene or polypropylene; a polyimide resin such as an aramid resin; a polyimide resin such as polyimide or polyamideimide; an acrylic resin such as polyacrylic acid, polyacrylic acid salt (e.g., lithium polyacrylate), ethylene-polyacrylic acid copolymer; a vinyl resin such as polyacrylonitrile or polyvinyl acetate; a polyvinylpyrrolidone; a rubbery material such as a styrene-butadiene copolymer rubber (SBR), and the like. These may be used singly or in combination of two or more. Among them, acrylic resins exert a high binding force to Si-containing materials.

Note that Si-containing materials are prone to increase the internal resistance because of large expansion and contraction during charge and discharge, and the cycle characteristics are also prone to decrease. On the other hand, by using an acrylic resin as a binder and allowing the liquid electrolyte contain LFSI, an increase in internal resistance and a decrease in cycle characteristics are greatly suppressed. This is because, when a liquid electrolyte containing LFSI is immersed in a negative electrode containing an acrylic resin, swelling of the acrylic resin is suppressed, and a high degree of binding force of the acrylic resin is maintained, and an increase in contact resistance between the negative electrode active material particles and between the negative electrode active material particles and the negative electrode current collector is suppressed. The acrylic resin may be, for example, 1.5 parts by mass or less per 100 parts by mass of the negative electrode active material, and may be 0.4 parts by mass or more and 1.5 parts by mass or less.

Examples of the conductive agent include: carbon blacks, such as acetylene black; conductive fibers, such as carbon fibers and metal fibers; fluorinated carbon; metal powders, such as aluminum; conductive whiskers, such as zinc oxide and potassium titanate; conductive metal oxides, such as titanium oxide; and organic conductive materials, such as phenylene derivatives. These may be used singly or in combination of two or more.

Examples of the thickener include: carboxymethyl cellulose (CMC) and modified products thereof (including salts such as Na salt); cellulose derivatives (e.g., cellulose ether), such as methyl cellulose; saponified products of a polymer having a vinyl acetate unit, such as polyvinyl alcohol; polyether (e.g., polyalkylene oxide, such as polyethylene oxide). These may be used singly or in combination of two or more.

The dispersion medium is not particularly limited, and examples thereof include water, an alcohol, and N-methyl-2-pyrrolidone (NMP).

[Liquid Electrolyte]

The liquid electrolyte usually includes a lithium salt, a solvent and an additive. Various additives may be included in the liquid electrolyte. Isopropyl acetate is classified as the additive. In the liquid electrolyte, it is preferable that the total amount of the lithium salt and the solvent occupies 90 mass % or more, more preferably 95 mass % or more, of the liquid electrolyte.

Used as the solvent are a cyclic carbonic acid ester, a cyclic carboxylic acid ester, a chain carbonic acid ester and a chain carboxylic acid ester, and an electrolyte component which exhibits a liquid state at 25° C. and is contained in a liquid electrolyte in an amount of 3 mass % or more. One or more of these solvents may be used in any combination.

Examples of the cyclic carbonic acid ester include propylene carbonate (PC), ethylene carbonate (EC), fluoroethylene carbonate (FEC), vinylene carbonate (VC), and vinyl ethylene carbonate (VEC).

Examples of the chain carbonic acid ester include diethyl carbonate (DEC), ethyl methyl carbonate (EMC), and dimethyl carbonate (DMC).

Examples of the chain carboxylic acid ester include methyl formate, ethyl formate, methyl acetate, ethyl acetate, and methyl propionate. Among them, methyl acetate is highly stable and low in viscosity, which may improve the low-temperature characteristics of the battery. Further, by using methyl acetate and isopropyl acetate in combination, gas generation due to decomposition of methyl acetate tends to be suppressed. The content of methyl acetate in the liquid electrolyte may be, for example, 3 mass % or more and 20 mass % or less.

Examples of the cyclic carboxylic acid ester include γ-butyrolactone (GBL) and γ-valerolactone (GVL)

Note that a polymer which alone exhibits a solid state at 25° C. is not included in the liquid electrolyte component even when the content thereof in the electrolyte is 3 mass % or more. Such a polymer functions as a matrix for gelling a liquid electrolyte.

Examples of the additive include a carboxylic acid, an alcohol, 1,3-propanesultone, methylbenzenesulfonate, cyclohexylbenzene, biphenyl, diphenyl Ether, and fluorobenzene in addition to 1,4-dioxane.

The liquid electrolyte may contain, in addition to the lithium salt already mentioned, yet another salt. Other salts include $LiClO_4$, $LiAlCl_4$, $LiB_{10}Cl_{10}$, $LiBF_4$, $LiSbF_6$, $LiAsF_6$, $LiCF_3SO_3$, $LiCF_3CO_2$, $LiN(CF_3SO_2)_2$, $LiN(CF_3SO_2)(C_4F_9SO_2)$, $LiN(C_2F_5SO_2)_2$, LiCl, LiBr, LiI, and the like. One or more of the lithium salts may be used in any combination.

[Separator]

It is desirable to interpose a separator between the positive electrode and the negative electrode. The separator is excellent in ion permeability and has appropriate mechanical strength and electrically insulating properties. The separator may be, for example, a microporous thin film, a woven fabric, or a nonwoven fabric. The separator is preferably made of, for example, polyolefin, such as polypropylene or polyethylene.

Examples of the structure of the non-aqueous electrolyte secondary battery include a structure in which an electrode group including the positive and negative electrodes wound together with a separator interposed therebetween, and a non-aqueous liquid electrolyte are housed in an external material. The wound-type electrode group may be replaced with a different form of electrode group, for example, a stacked-type electrode group formed by stacking a positive electrode and a negative electrode with a separator interposed therebetween. Non-aqueous electrolyte secondary batteries may be in any form, such as cylindrical, rectangular, coin, button, laminated, and the like.

The FIGURE is a schematic partially cut-away oblique view of a rectangular non-aqueous electrolyte secondary battery according to one embodiment of the invention.

The battery is equipped with a bottomed-square battery case 4 and electrode group 1 and a non-aqueous liquid electrolyte (not shown) housed within battery case 4. Electrode group 1 has a longitudinal band-like negative electrode and a longitudinal band-like positive electrode with an intervening separator between them. Electrode group 1 is formed by winding the negative electrode, positive electrode and separator around a flat winding core and withdrawing the winding core.

One end of negative electrode lead 3 is attached to the negative electrode current collector of the negative electrode by welding or the like. One end of positive electrode lead 2 is attached to the positive electrode current collector of the positive electrode by welding or the like. The other end of negative electrode lead 3 is electrically connected to negative terminal 6 provided on sealing plate 5 through gasket 7. The other end of positive electrode lead 2 is electrically connected to battery case 4 which also serves as a positive terminal. At the top of electrode group 1 disposed is a resin frame that separates electrode group 1 and sealing plate 5 as well as separates negative electrode lead 3 and battery case 4. The opening of battery case 4 is sealed with sealing plate 5.

The structure of the non-aqueous electrolyte secondary battery may be a cylindrical, coin-shaped, button-shaped or the like having a metal battery case, and may be a laminate type having a laminate sheet battery case made of a laminated body of a barrier layer and a resin sheet.

The present invention will be specifically described below with reference to Examples and Comparative Examples. The present invention, however, is not limited to the following Examples.

Examples 1 to 2 and Comparative Examples 1 to 4

[Preparation of LSX].

Silicon dioxide and lithium carbonate were mixed so that the atomic ratio: Si/Li was 1.05, and the mixture was calcined in air at 950° C. for 10 hours to obtain a lithium silicate represented by the formula: $Li_2Si_2O_5$ (u=0.5). The obtained lithium silicate was pulverized so as to have an average particle diameter of 10 μm.

The lithium silicate ($Li_2Si_2O_5$) having an average particle diameter of 10 μm and raw material silicon (3N, average particle diameter: 10 μm) were mixed at a mass ratio of 45:55. The mixture was introduced into a pot (made of SUS, volume: 500 mL) of a planetary ball mill (P-5, manufactured by Fritsch Japan Co., Ltd.), and 24 balls made of SUS (diameter: 20 mm) were placed in the pot and the lid thereof was closed. Then, the mixture was subjected to a grinding treatment at 200 rpm for 50 hours in an inert atmosphere.

Then, the powder-like mixture was collected in an inert atmosphere, and the mixture was fired at 800° C. for 4 hours with a pressure applied by a hot press machine in an inert atmosphere to obtained a sintered material (LSX).

Subsequently, LSX was crushed and passed through a 40-μm mesh, then the resulting LSX particles were mixed with coal pitch (MCP250 manufactured by JFE Chemical Co., Ltd.). The obtained mixture was calcined in an inert atmosphere at 800° C., and the surface of LSX particles was coated with a conductive carbon to form a conductive layer. Coating amount of the conductive layer was 5 mass % with respect to the total mass of the LSX particles and the conductive layer. Subsequently, using a sieve, LSX particles with the conductive layer with an average particle diameter of 5 μm were obtained.

[Preparation of Negative Electrode].

LSX particles with the conductive layer were mixed with graphite at a mass ratio of 6:94 and used as negative electrode active materials. The negative electrode active materials, lithium polyacrylate, and a styrene-butadiene rubber (SBR) were mixed in a mass ratio of 97.5:1:1.5, added with water, and then stirred using a mixer (T. K. HIVIS MIX, manufactured by PRIMIX Corporation) to prepare a negative electrode slurry. Next, the negative electrode slurry was applied to the surface of a copper foil, and the applied film was dried, and then rolled to give a negative electrode having negative electrode material mixture layers of a density of 1.5 g/cm$^3$ on both sides of the copper foil.

[Preparation of Positive Electrode].

Lithium nickel composite oxides ($LiNi_{0.8}Co_{0.18}Al_{0.02}O_2$), acetylene black and polyvinylidene fluoride were mixed at a mass ratio of 95:2.5:2.5, added with N-methyl-2-pyrrolidone (NMP), and then stirred using a mixer (T. K. HIVIS MIX, manufactured by PRIMIX Corporation) to prepare a positive electrode slurry. Next, the positive electrode slurry was applied to the surface of an aluminum foil, and the applied film was dried, and then rolled to give a positive electrode having positive electrode mixture layers of a density of 3.6 g/cm$^3$ formed on both sides of the aluminum foil.

[Preparation of Non-Aqueous Liquid Electrolyte].

As the solvent, a mixed solvent containing ethylene carbonate (EC), ethyl methyl carbonate (EMC), dimethyl carbonate (DMC) and methyl acetate (MA) at a volume ratio of 20:5:55:20 was used. LFSI and $LiPF_6$ were dissolved in the mixed solvent at the ratios shown in Table1. In addition, isopropyl acetate was contained in the liquid electrolyte by the content shown in Table 1.

[Fabrication of Non-Aqueous Electrolyte Secondary Battery].

The positive electrode and the negative electrode, with a tab attached to each electrode, were wound spirally with a separator interposed therebetween such that the tabs were positioned at the outermost layer, thereby to form an electrode group. The electrode group was inserted into an external material made of aluminum laminate film, vacuum-dried at 105° C. for 2 hours, followed by injection of the non-aqueous liquid electrolyte and sealing the opening of the external material to obtain Batteries A1 to A2 of Examples 1 to 2 and Batteries B1 to B4 of Comparative Examples 1 to 4.

[Evaluation]

Each battery after fabrication, in an ambient of 45° C., was subjected to constant current charge until the voltage became 4.2 V at a current of 0.3 It (800 mA), and constant voltage charge until the current became 0.015 It (40 mA) at a constant voltage of 4.2V. Subsequently, constant current discharge was performed until the voltage became 2.75 V at a current of 0.3 It (800 mA).

The rest period between the charge and discharge was 20 minutes, and the charge and discharge were repeated for 300 cycles under the above-mentioned charge and discharge conditions. The ratio of the discharge capacity of the 300 th cycle to the discharge capacity of the first cycle was determined as capacity maintenance ratio. The results are shown in Table 1.

After 300 cycles, the battery was taken out and decomposed, and the components of the liquid electrolyte were analyzed by gas chromatography-mass spectrometry (GCMS), and it was confirmed that isopropyl acetate was present in the liquid electrolyte of batteries A1, A2, B2, and B4

The measuring conditions of GCMS used for analyzing the liquid electrolyte are as follows.

Equipment: GC17A, GCMS-QP5050A manufactured by Shimadzu Corporation.

Columns: HP-1 (1.0 μm membrane thickness x 60 m length) manufactured by Agilent Technology Column temperature:50° C.→110° C. (5° C./min,12 min hold)→250° C. (5° C./min, 7 min hold)→300° C. (10° C./min, 20 min hold)

Split ratio:1/50
Linear velocity:29.2 cm/s
Injection port temperature:270° C.
Injection volume:0.5 μL
Interface temperature: 230° C.
Mass range: m/z=60-100 (SCAN mode)

TABLE 1

| Batteries | LFSI (M) | LiPF$_6$ (M) | Isopropyl acetate (ppm) | Capacity maintenance ratio (300 cycles) |
|---|---|---|---|---|
| A1 | 0.4 | 0.95 | 50 | 78.7 |
| A2 | 0.4 | 0.95 | 100 | 79.5 |
| B1 | 0 | 1.35 | — | 76.4 |
| B2 | 0 | 1.35 | 50 | 77.3 |
| B3 | 0.4 | 0.95 | — | 77.4 |
| B4 | 0.4 | 0.95 | 3000 | 76.0 |

Industrial Applicability

According to the present invention, it is possible to provide a non-aqueous electrolyte secondary battery excellent in long-term cycle characteristics. The non-aqueous electrolyte secondary battery of the invention is useful for the main power sources of mobile communication devices, mobile electronic devices, and the like.

REFERENCE SIGNS LIST

1: Electrode group
2: positive electrode lead
3: negative electrode lead
4: battery case
5: sealing plate
6: negative terminal
7: gasket

The invention claimed is:

1. A liquid electrolyte for a non-aqueous electrolyte secondary battery containing: a lithium salt, methyl acetate and isopropyl acetate,
   wherein the lithium salt includes lithium bis(fluorosulfonyl)imide and
   a content of isopropyl acetate is 50 ppm or more and 200 ppm or less in terms of mass ratio.

2. A non-aqueous electrolyte secondary battery comprising: a positive electrode, a negative electrode and a liquid electrolyte,
   wherein the liquid electrolyte contains a lithium salt, methyl acetate and isopropyl acetate,
   the lithium salt includes lithium bis(fluorosulfonyl)imide, and
   a content of isopropyl acetate in the liquid electrolyte is 50 ppm or more and 1000 ppm or less with respect to a mass of the liquid electrolyte.

3. The non-aqueous electrolyte secondary battery according to claim 2, wherein an amount of lithium bis(fluorosulfonyl)imide in the lithium salt is 1 mol % or more and 60 mol % or less.

4. The non-aqueous electrolyte secondary battery according to claim 2, wherein a concentration of lithium salt in the liquid electrolyte is 1 mol/liter or more and 2 mol/liter or less.

5. The non-aqueous electrolyte secondary battery according to claim 2, wherein the lithium salt further includes LiPF$_6$.

6. The non-aqueous electrolyte secondary battery according to claim 2, wherein the positive electrode contains a composite oxide containing lithium and nickel,
   the composite oxide being a layered compound having a rock salt-type crystal structure represented by a general formula: Li$_a$Ni$_b$M$_{1-b}$O$_2$,
   wherein M is a metal and/or a semi-metal other than Li and Ni,
   0.95≤a≤1.2 and
   0.6≤b≤1.

* * * * *